Dec. 18, 1945.  E. K. CARVER  2,391,127
ANTIHALATION COATINGS
Filed Feb. 17, 1942
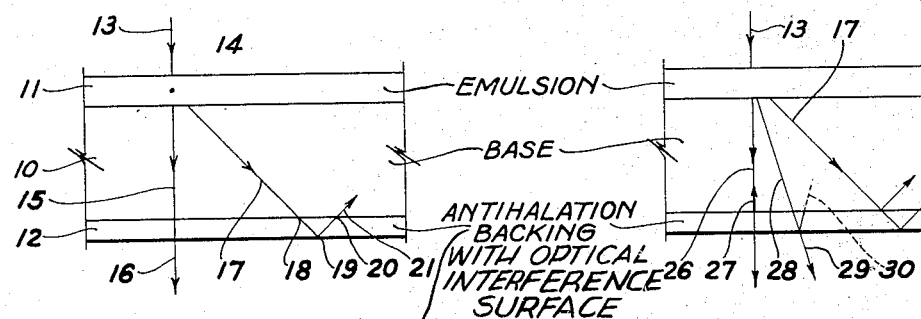
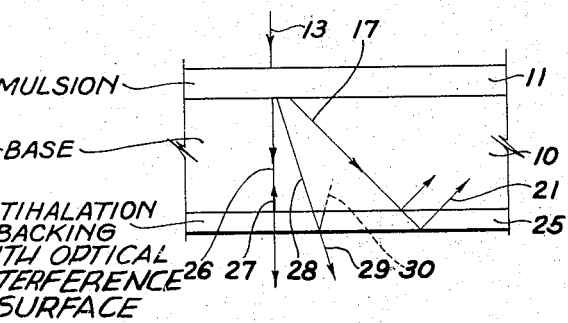
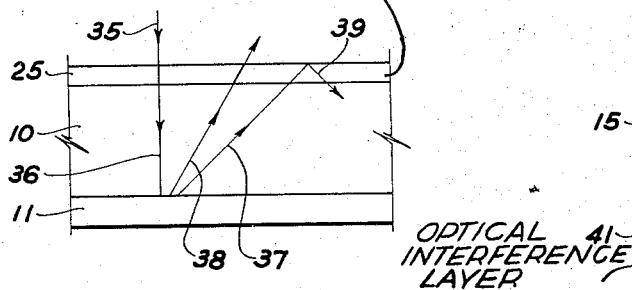
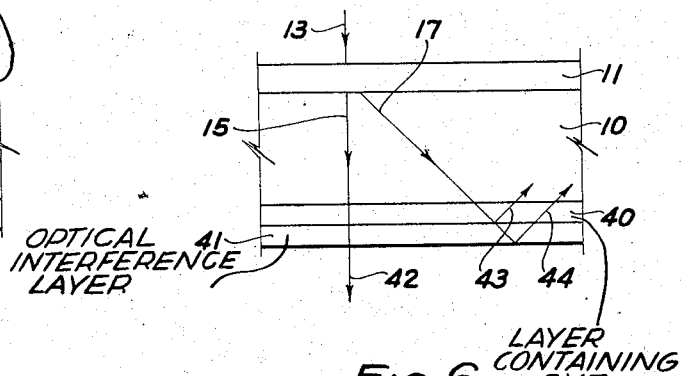
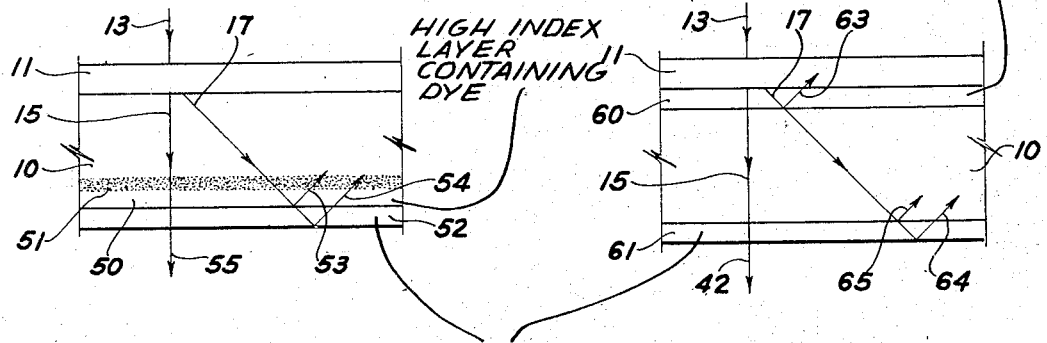
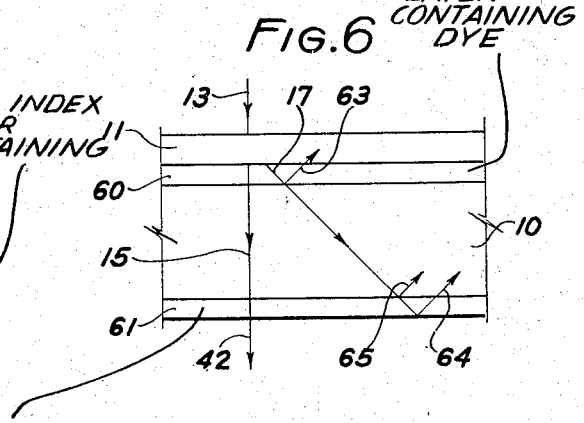
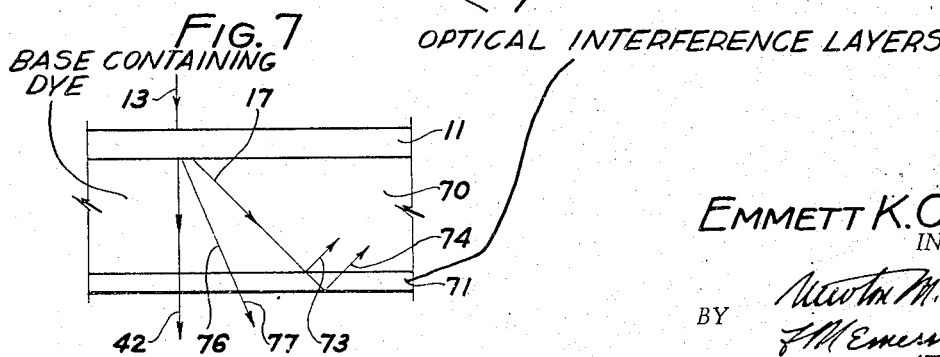
EMMETT K. CARVER
INVENTOR
BY
ATTY. & AGT.

UNITED STATES PATENT OFFICE 2,391,127

ANTIHALATION COATINGS

Emmett K. Carver, Rochester, N. Y., assignor to Eastman Kodak Company, Rochester, N. Y., a corporation of New Jersey Application February 17, 1942, Serial No. 431,260

6 Claims. (Cl. 95—9)

This invention relates to photographic film, and particularly to antihalation layers for such film.

It is an object of the invention to provide a highly efficient antihalation coating.

One difficulty encountered in the use of antihalation layers is the fact that the removal thereof after exposure is not easy, particularly when the layer is a high density layer. For this reason low density antihalation layers are preferable, but, of course, they are not as efficient in reducing halation. Also, in those processes of photography which require exposure through the support for the emulsion, an antihalation layer is placed on the back of the support and must have a low density particularly to light of normal incidence. Of course, low optical density layers have relatively high density to oblique rays of light, and it is the oblique rays of light that are the most troublesome and cause the widest halation.

It is, therefore, an object of the invention to produce a layer to reduce halation at practically all obliquities and still have relatively low optical density, particularly at normal incidence.

It is an object of a preferred embodiment of the invention to have an antihalation layer which is highly efficient at high and medium obliquities of light, but has reduced density to light of normal incidence, which is harmless anyway as far as halation is concerned.

According to the invention, an optical interference reflection reducing layer is made to cooperate with an antihalation dye layer in a novel manner to give a highly efficient antihalation support particularly a support in which the falling off of the efficiency of the dye at low obliquities is counteracted. Halation is caused by light striking a photographic emulsion layer and being transmitted or reflected diffusely and then being specularly reflected by the back of the support so as to strike the emulsion again to one side of the point at which it was originally focused. Of course, the diffusion of the light by the emulsion layer is not complete and, hence, there is a greater intensity of light in the region immediately around the original point and in general, this is not objectionable since it falls within the circle of confusion of the optical system anyway. Any antihalation dye, whether of high or low density has its highest density to oblique light, which, of course, is the most troublesome even though it is of reduced intensity. The dye also has less optical density, preferably quite low density in the embodiment referred to above, for less oblique or normal incident light. Non-reflecting optical interference layers can, by proper selection of thickness, be made efficient at any specified angle, but the efficiency falls off at other angles of incidence. According to the invention, the interference coating is selected to cooperate with the dye by being efficient at angles less than those at which the dye is most efficient, i. e. at angles of low obliquity. In the preferred embodiment of the invention the dye has a low optical density to perpendicularly incident light, i. e. density less than .5. Such a low density is permitted by the present invention, since the optical interference layer takes care of the scattered light up to relatively high obliquities, after which even this low density layer becomes highly absorbent.

In the most preferred embodiment of the invention the interference layer has a thickness giving substantially optimum interference to light incident at angles between 10° and 60° from the normal. For normal light and light of less than 10 degrees spread, the halation is quite harmless since it falls on or immediately adjacent to the point of the emulsion originally exposed. At angles greater than 60° from the normal any dye layer which is used, even one of low normal optical density, is highly efficient. The present invention permits the use of even lower density dyes than previously permissible.

Although the interference layer should be on the back of the support in order to get the greatest efficiency, the dye may be in various positions. For example, if it is a low density dye, it may be incorporated right in the support itself or the support may be made up of a plurality of layers in one of which the dye is incorporated. The additional layer constituting part of the support may be immediately adjacent to the emulsion or may be between the interference layer and the support proper. Of course, if the dye layer is between the interference layer and the support proper, it may be thought of as constituting part of the antihalation coating on the back of the support. Additional dye may also be included in the interference layer itself.

This invention may be combined with that described in U. S. application 358,512, Nadeau and Hilborn, filed September 26, 1940, now U. S. Patent 2,331,716, wherein a high index layer is diffused into the support, before the interference coating is applied thereto. As before, the dye may be incorporated in the support, or in the in-between layer which in this case has high index of refraction. A particularly satisfactory arrangement results when the dye is incorporated in the high index layer, since this permits a wider selection of materials having a high index of refraction because many such materials have a small but noticeable optical density. If the optical interference layer is a single layer, it should have a thickness equal to a quarter wave length of the light for which it is to be most efficient and should preferably have an index of refraction approximating the square root of the index of the layer with which it forms a sharp interface. However, the more complicated optical interference layers involving a plurality of layers are equally useful with the present invention which does not depend on the type of interference layer used.

The various embodiments of the invention will be more fully understood from the description of the accompanying drawing in which:

Fig. 1 shows a simple embodiment of the invention.

Fig. 2 shows a preferred embodiment in which the interference layer has optimum effect at angles of incidence somewhat different from normal.

Fig. 3 shows a similar embodiment wherein the emulsion is exposed through the base.

Fig. 4 illustrates the principle of the invention the thickness of the interference coating being exaggerated.

Fig. 5 similarly shows a combination of the present invention with that of Nadeau et al. mentioned above.

Fig. 6 similarly shows an embodiment wherein the dye is incorporated in a layer immediately under the emulsion.

Fig. 7 similarly shows an embodiment wherein the dye is incorporated in the base itself.

In Fig. 1 film support 10 is coated on one side with an emulsion 11 and on the other side with an antihalation backing 12 with an optical interference coating on the exposed surface thereof. Light represented by the arrow 13 striking the emulsion is scattered by particle 14 of the emulsion so that some of it travels straight through as shown by the arrows 15 and 16 whereas some of it is scattered as shown by arrow 17 to strike the antihalation backing obliquely. Since this latter layer 12 has a surface treated to cause optical interference, the ray 15 is only slightly reflected, if at all, and the major portion of it passes through as shown by the arrow 16. On the other hand, the oblique ray 17 striking the interference coating would not be reduced in reflection by interference as much as would the normally incident ray, but since the path of the light through the antihalation backing, i. e. since the distance between the points 18, 19, and 20 is relatively long, the dye in this layer absorbs much of the light from the ray 17 so that only a very small part thereof as represented by the arrow 21 is reflected to cause halation in the emulsion.

In Fig. 2, the interference coating on the antihalation layer 25 is selected of such thickness that it has its optimum effect for light incident thereon at angles between 10 and 60° from the normal. In this case, the normal ray 26 is partly reflected as shown by the arrow 27, but the slightly oblique ray 28 is practically entirely transmitted as shown by the arrow 29 and only slightly reflected, if at all, as shown by the broken line 30. The advantage of this embodiment is the fact that the normally incident light when reflected is entirely harmless anyway since it strikes the same point in the emulsion as that at which it was transmitted. Therefore, the light represented by the arrow 27 is harmless. Also, since the interference coating is quite efficient for rays between 10 and 60° from the normal, it is more efficient than the coating on layer 12 of Fig. 1 for rays of medium obliquity, e. g. rays of 45° from the normal. Thus, in this case the interference coating on layer 25 cooperates more closely with the effect of the dye and in turn permits a dye of lower density to be used.

In Fig. 3 the light 35 from the subject or lens passes through the antihalation backing 25 as shown by the ray 36 to strike the emulsion 11 and the scattering is by reflection. In this case the ray 38 is transmitted by the interference coating on the layer 25 since it strikes it at the angle of optimum interference effect and the ray 37 is of such great obliquity that it is greatly absorbed by the dye in the layer 25 and only a small percentage thereof is reflected to cause halation, as indicated by the arrow 39.

In Fig. 4 a dye layer 40 is applied to the base 10 before the interference layer 41 is placed thereon. The thickness of the coating 41 is greatly exaggerated in this figure to illustrate the principle thereof, but the present invention is independent of the method of producing the optical interference layer on the dye layer. The interference layer may have its optimum absorption either for normal light corresponding to Fig. 1 or for slightly oblique light corresponding to Fig. 2. In either case the normally incident light 15 is mostly transmitted as shown by the arrow 42. The light reflected from the front and back surface of the interference layer passes through a long path in the dye layer 40 and only a small amount of light as indicated by arrows 43 and 44 reaches the emulsion layer 11. Obviously, the layer 40 may be considered along with the layer 10 as constituting the support, or the layers 40 and 41 may be considered as combined and constituting the antihalation coating for a simple support 10 as in Fig. 1.

In Fig. 5 the invention is combined with that of Nadeau and Hilborn mentioned above, and in this case a high index layer 50 is diffused into the support 10 as indicated by the diffused interface 51. In accordance with the teachings of Nadeau and Hilborn such a high index layer permits a more efficient interference layer 52 to be coated thereon. As before, this layer may be coated to have its optimum efficiency either for normal light or for slightly oblique light. The normal ray 15 is at least more highly transmitted than it would be in the absence of the interference layer, as indicated by the arrow 55. The reflection from the front and back surfaces of the interference layer 52 is indicated by arrows 53 and 54 and has reduced intensity due to the dye is incorporated either in the layer 10 or in the layer 50. Most preferably, the dye is in the layer 50 to permit wider selection of materials for layer 50 and to be fairly accessible for removal during processing of the film.

In Fig. 6 the dye layer 60 is coated between the base 10 and the emulsion 11 and the interference layer 61 is coated on the back of the layer 10. As before, the normal ray 15 is mostly transmitted as shown by arrow 42 and the oblique ray 17 as reflected at the various interfaces is absorbed by the dye in the layer 60. If the layer 60 and the layer 10 have the same index of refraction, there is, of course, no reflection at the interface there-between and, hence, the ray 63 has zero intensity. However, both the rays 64 and 65 are absorbed by the dye in the layer 60 as is the ray 17 itself when first transmitted therethrough.

In Fig. 7 there is shown a simple form of the invention which is applicable to those embodiments requiring only a low density of dye. In this embodiment the base 70 itself contains the absorbent dye and the interference coating 71 is coated directly on this base. The normal ray 15 is mostly transmitted as shown by the arrow 42, the slightly oblique ray 76 is practically entirely transmitted as shown by the ray 77, and the highly oblique ray 73 is greatly absorbed in its first passage through the base 70, and after reflection as shown by the arrows 73 and 74 it passes again through the base 70 to be again greatly absorbed before striking the emulsion layer to cause little if any halation.

Just as Figs. 2 and 3 correspond to each other, the embodiments shown in Figs. 1, 4, 5, 6, and 7 may be used for exposure through the base when the antihalation dye used has a low density to normally incident light, i. e. has a density less than .5, preferably less than .3. Obviously, one of the main advantages of the interference coating is that it permits a less dense dye to be used. This is particularly useful when very low density dye is made necessary by the fact that the film must be exposed through the support. However, it is also useful where higher concentrations of dye are permitted, since it is always desirable to keep the concentration as low as possible to permit removal thereof during processing. On the other hand, interference layers alone are not entirely satisfactory since they have their optimum efficiency for one obliquity only and fall off in efficiency at other angles of incidence. The combination of an interference coating and a dye layer permits the dye to take care of the highly oblique rays which in many cases are quite appreciable even though they are of relatively low intensity and the interference layer to take care of the medium and/or low obliquity rays.

What I claim and desire to secure by Letters Patent of the United States is:

1. A photographic film comprising a photosensitive layer, a transparent support for the layer, and an optical interference layer on the back of the support for reducing the reflection of all halation producing light incident on the optical interference layer at angles less than 60° from the normal, said support and layer having an optical density less than .5 to light normally incident thereon and sufficiently high to absorb effectively all halation producing light obliquely incident thereon at angles greater than 60°, said halation producing light in both instances being that to which the photosensitive layer is sensitive.

2. A photographic film according to claim 1 in which the interference layer has a thickness giving substantially optimum interference to normally incident light.

3. A photographic film according to claim 1 in which the interference layer has a thickness giving substantially optimum interference to light incident at angles between 10° and 60° from the normal.

4. A photographic film comprising a photosensitive layer, a transparent support for the layer and an antihalation coating on the back of the support having an optical density less than .5 to light normally incident thereon and sufficiently high to absorb all halation producing light obliquely incident on the coating at angles greater than 60° and including at least one layer of optical interference thickness for reducing the reflection of all halation producing light less obliquely incident thereon, said halation producing light in both instances being that to which the photosensitive layer is sensitive.

5. A photographic film according to claim 4 in which the coating includes between the interference layer and the support an intermediate layer containing a light absorbent having substantially all of said optical density.

6. A photographic film according to claim 4 in which the coating includes between the interference layer and the support an intermediate layer forming a sharp interface with the interference layer and a diffused interface with the support, said intermediate layer containing a light absorbent having substantially all of said optical density.

EMMETT K. CARVER.